Ingle & Wright.
Wheel Cultivator.

N° 46,675. Patented Mar. 7, 1865.

Witnesses:

Inventor:

UNITED STATES PATENT OFFICE.

JOHN W. INGLE AND R. H. WRIGHT, OF LIVINGSTON, ILLINOIS.

IMPROVEMENT IN CULTIVATORS.

Specification forming part of Letters Patent No. 46,675, dated March 7, 1865.

*To all whom it may concern:*

Be it known that we, JOHN W. INGLE and R. H. WRIGHT, of Livingston, in the county of Moultrie and State of Illinois, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1:
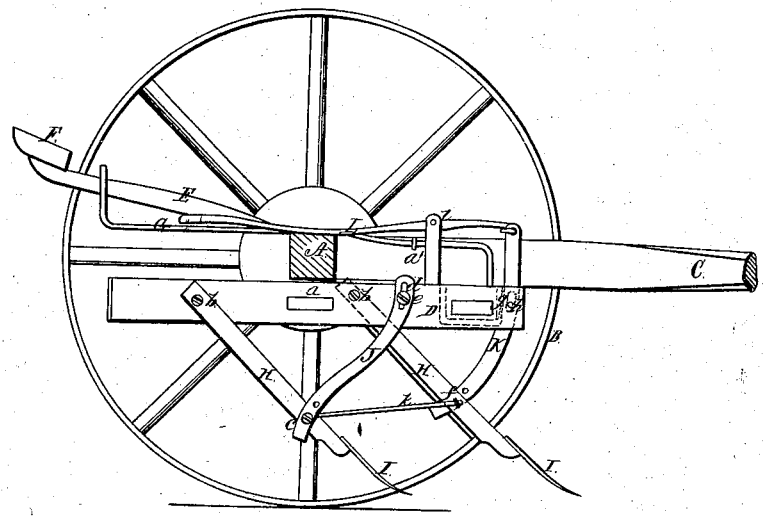
Figure 2:
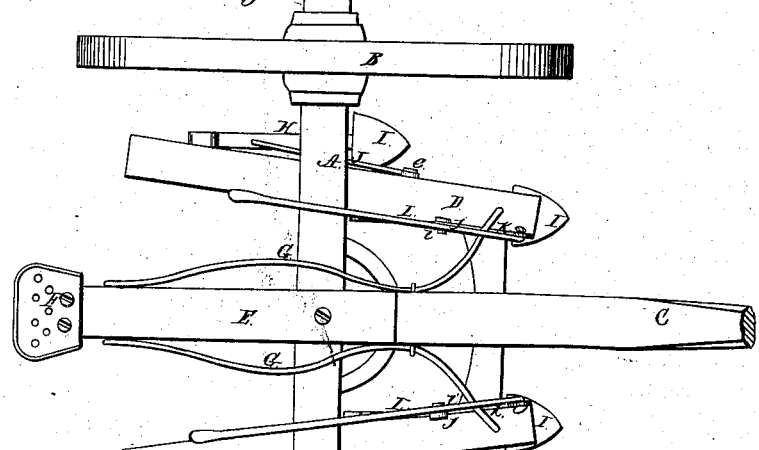

Figure 1 represents a side sectional view of our invention, taken in the line $x\,x$, Fig. 2; Fig. 2, a plan or top view of the same.

Similar letters of reference indicate like parts.

This invention relates to a new and improved cultivator designed for cultivating those crops which are grown in hills or drills; and it consists in a novel construction of the parts, whereby the plows may be adjusted laterally when the machine is in motion or at work, in order that the plows may be made to conform to the sinuosities of the rows of plants, and the plows also readily elevated out of the ground, the plows being under the complete control of the operator.

A represents an axle, having a wheel, B, fitted loosely on each end of it, and a draft-pole, C, attached centrally to it.

D represents a V-shaped frame, which is attached by a bolt, $a$, to the under side of the axle A, and is allowed to turn freely on said bolt.

E is a bar, which is slightly inclined from a horizontal line, and is secured to the axle A in the same line with the draft-pole C, said bar having the driver's seat F on its outer end.

G G represent two levers, which are connected by joints $a'\,a'$, one to each side of the draft-pole C. The front ends of these levers are attached to the front part of the frame D, and said levers extend back to the driver's seat F, and are curved or bent upward, so that they may be readily operated by the feet or knees of the driver.

To each side of the frame D there are attached, by pivots $b$, two standards, H H. These standards have each a plow, I, of shovel or other form, secured to them. The standards H are allowed to work or turn freely on their pivots $b$. The front plows are rather nearer together than the rear plows, and the standards H H have each a segment-bar, J, attached to them by a pivot, $c$, the upper ends of the bars J J having oblong curved slots $d$ made in them, through which pins $e$ pass into frame D.

K K are segment bars, which are attached to the front standards H H by pivots $f$, and also have oblong curved slots $g$ made in them, through which pins $h$ pass into the frame D. These bars K extend upward above the frame D, and have each a lever, L, connected with them, said levers having their fulcra $i$ at the upper ends of uprights $j$, and extending back within convenient reaching distance of the driver on seat F. The rear standards H are connected to the forward ones by rods $k$.

From the above description it will be seen that as the machine is drawn along the plows may be moved or adjusted laterally to conform to the sinuosities of the rows of plants by actuating the levers G G, and the plows may be raised out of the ground, when desired, by actuating the levers L L, the segments K of the front standards being raised, and consequently the front standards H, motion being communicated from the latter to the rear standards by the rod $k$. The segment-bars J K serve as guides for the plow-standards.

We do not claim broadly a cultivator provided with laterally and vertically moving plows, for such device has been previously used; but We do claim as new and desire to secure by Letters Patent—

The frame D, attached to the axle A by a pivoted bolt, $a$, and provided with pivoted plow-standards H, connected by rods $k$, the segment-bars J K, and levers L L, in combination with the levers G G, attached to the frame D, and draft-pole C, all arranged to operate substantially as and for the purpose set forth.

JOHN W. INGLE.
R. H. WRIGHT.

Witnesses:
STEPHEN CANNON,
A. B. HOSTETTER.